United States Patent
Michatek et al.

[15] 3,673,938
[45] July 4, 1972

[54] MULTIPLE FUNCTION FRAME MEMBER FOR CAMERAS

[72] Inventors: Chester W. Michatek, Rochester; Donald M. Harvey, Webster, both of N.Y.

[73] Assignee: Eastman Kodak Company, Rochester, N.Y.

[22] Filed: April 2, 1971

[21] Appl. No.: 130,753

[52] U.S. Cl. ............................................. 95/13, 95/11 R
[51] Int. Cl. ....................................................... G03b 17/50
[58] Field of Search ............................................ 95/13, 11 R

[56] References Cited

UNITED STATES PATENTS

| | | | |
|---|---|---|---|
| 3,350,990 | 11/1967 | Finelli et al. | 95/13 |
| 2,455,125 | 11/1948 | Land | 95/13 |
| 3,455,222 | 7/1969 | Downey | 95/13 |

*Primary Examiner*—Samuel S. Matthews
*Assistant Examiner*—Richard L. Moses
*Attorney*—W. H. J. Kline and J. Addison Mathews

[57] ABSTRACT

A self-processing camera adapted to be loaded with a film pack is provided with a novel internal metal frame member that serves a number of functions including, increasing the structural rigidity of the camera housing, accurately establishing the operative location of the film pack within the camera housing, providing for convenient light-tight attachment of the camera bellows to the camera housing, and resiliently supporting a film processing pressure member to provide uniform pressure at the nip defined between that member and a roller or the like carried by the movable cover door of the camera housing.

7 Claims, 8 Drawing Figures

PATENTED JUL 4 1972

CHESTER W. MICHATEK
DONALD M. HARVEY
INVENTORS

BY /Addingmathms
W.H.J. Kline
ATTORNEYS

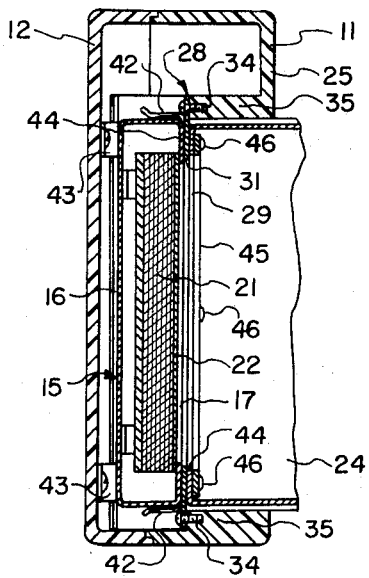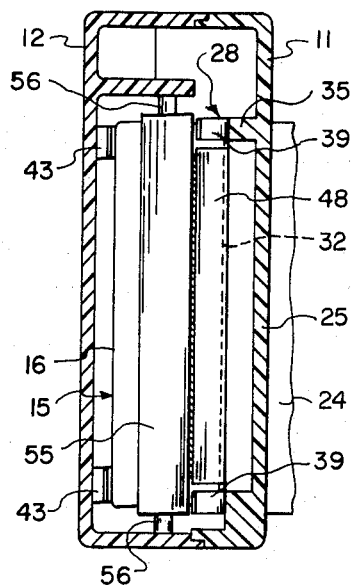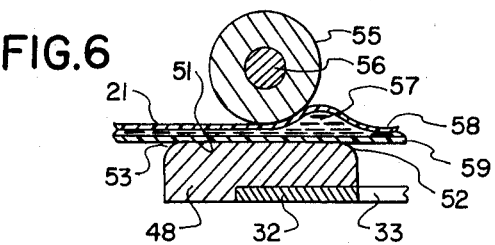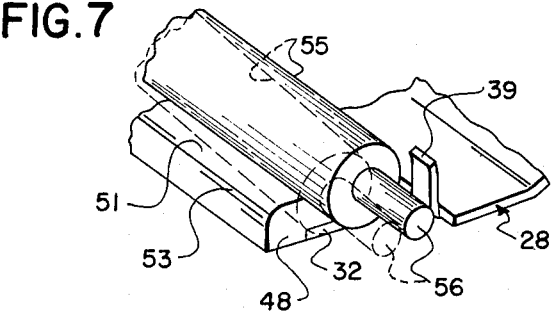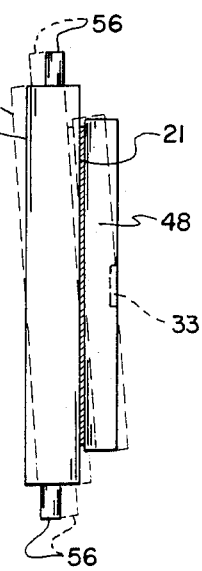

3,673,938

MULTIPLE FUNCTION FRAME MEMBER FOR CAMERAS

BACKGROUND OF THE INVENTION

1. Field of the Invention

The present invention relates to self-processing film pack cameras and more particularly to the provision of such a camera with a novel multiple function frame member.

2. Description of the Prior Art

In recent years, the manufacture of cameras has been greatly simplified by the use of injection molded housings in place of the sheet metal housings previously employed. Where very critical location of various camera elements is involved, however, the use of such plastic materials is not completely satisfactory because of the inherent tendency of those materials to distort somewhat over an extended period of time, particularly if subjected to continuous pressures. This problem is accentuated in self-processing cameras because of the relatively large size of that type of camera and also because of the substantial force exerted on the pressure members between which the exposed film units are withdrawn during each film processing operation. For example, one of the pressure members is usually carried by the movable cover door of the camera while the confronting pressure member is supported by the camera housing. Such a construction therefore dictates the use of a relatively elaborate spring loaded metal support member which carries at least one of the pressure members to preserve the uniformity of the pressure exerted at the pressure-applying nip by compensating for distortion or dimensional inaccuracies of the housing or door. Similarly, it is a common practice to provide supplemental metal componants to position or support other elements of the camera where greater strength, accuracy or dimensional stability is required than can be achieved by means of molded plastic elements.

SUMMARY OF THE INVENTION

A principle object of the present invention is to improve the performance and longevity of self-processing film pack cameras, particularly those employing molded plastic housings, a correlative object being to accomplish those improvements while at the same time simplifying the construction of such cameras. Briefly, these and other related objectives are accomplished in accordance with a preferred embodiment of the invention by providing a self-processing film pack camera with a novel internal metal frame member that performs a number of functions including: increasing the structural rigidity of the camera housing, accurately establishing the operative location of the film pack within the camera housing, providing for convenient light-tight attachment of the camera bellows to the camera housing, and resiliently supporting a film processing pressure member to provide uniform pressure at the nip defined between that member and a roller or the like carried by the movable cover door of the camera housing.

Various means for practicing the invention and other advantages and novel features thereof will be apparent from the following detailed description of an illustrative preferred embodiment of the invention, reference being made to the accompanying drawings in which like reference numerals denote like elements.

BRIEF DESCRIPTION OF THE DRAWINGS

In the drawings:

FIG. 4 is a cross-sectional and elevational view taken along line 4—4 of FIG. 1;

FIG. 5 is a view corresponding to FIG. 4 but taken along line 5—5 of FIG. 1;

FIG. 6 is a fragmentary top view of the two pressure members employed in the illustrative camera;

FIG. 7 is a perspective view of the pressure members illustrating the manner in which the invention compensates for misalignment of the parallelism between the two pressure members in endwise relation to the camera housing; and FIG. 8 is a fragmentary end view of the illustrative camera showing the manner in which the frame member compensates for misalignment of the parallelism between the two pressure members in forward to rearward relation to the camera housing.

DESCRIPTION OF THE PREFERRED EMBODIMENT

Figure 1:
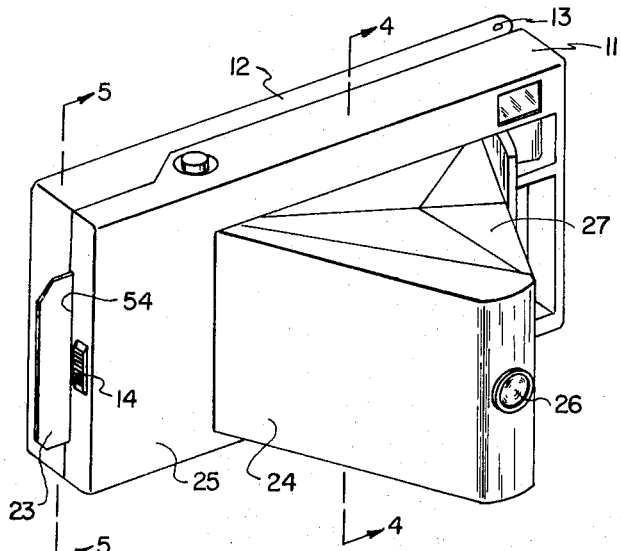
FIG. 1 is a perspective view of a self-processing film pack camera incorporating a frame member according to an illustrative preferred embodiment of the invention.
Figure 2:
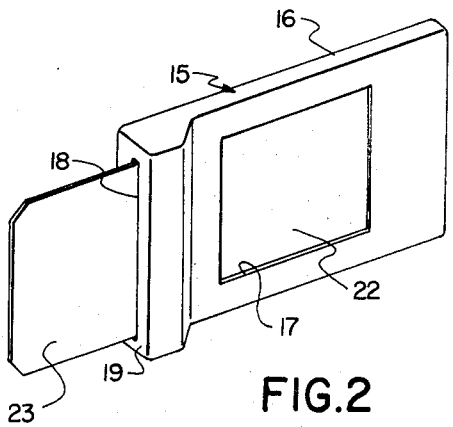
FIG. 2 is a perspective view of the film pack employed in the camera shown in FIG. 1.

The camera shown in the accompanying drawings, to illustrate the preferred embodiment of the invention, comprises a box-like housing 11 provided with a hinged rearward cover door 12 which can be opened to allow a film pack to be installed in the camera housing. Both the housing and its cover door are preferably made of injection molded plastic material. The cover door is attached to the housing by a hinge pin 13, and an appropriate latch device operated by slide button 14 releasably holds the cover door in its closed position. The film pack 15 is not a part of the present invention and need not be described in detail for purposes of the present disclosure. Briefly, however, the film pack comprises a metal or plastic casing 16 provided with a forwardly facing exposure window 17 and with an elongate slot 18 in its end wall 19. A plurality of self-processing film units are stacked within the housing as shown at numeral 21 in FIG. 4. An opaque mask sheet 22 initially covers window 17 and is provided with a leader strip 23 extending through slot 18. Each film unit is provided with a corresponding leader strip and means are provided whereby the removal of the mask sheet brings the leader strip of the first available film unit through slot 18. Similarly, the successive removal of each of the film units brings the leader strip of the next available unit to that same position. As is well known in the art of self-processing cameras, the removal of each successive film unit causes its rupturable container of processing fluid to be drawn between opposed pressure members in the camera, which rupture the container and distribute the processing fluid between two sandwiched sheets of the film unit to effect development of the exposed film image.

Figure 3:
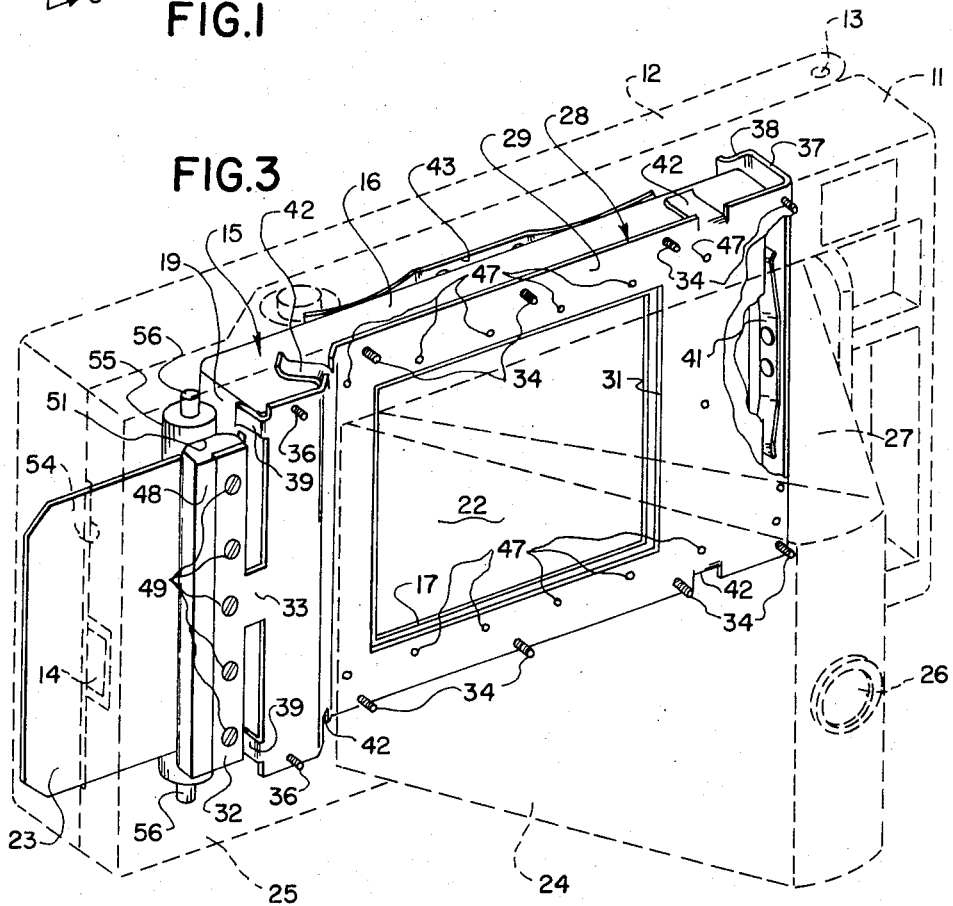
FIG. 3 is an enlarged phantom view corresponding to FIG. 1 and showing the novel frame member to which the present invention is directed.

A lens support door 24 is hinged to the front wall 25 of the camera housing and supports the camera lens 26 for movement between an extended or operative position shown in FIGS. 1 and 3 and a retracted or closed position at which door 24 is folded against the front wall of the housing. A bellows 27 connects the cover door to the housing to prevent light from reaching the film within the film pack except through lens 26. Further details of such a lens support door arrangement are disclosed, for example, in commonly assinged copending U.S. Pat. application, Ser. No. 111,469, entitled COMPACT FOLDING CAMERA, filed in the name of Donald M. Harvey on Feb. 1, 1971.

Referring to now to FIG. 3, the frame member 28 to which the present invention is particularly directed is a unitary element made of relatively stiff sheet metal and includes a flat section 29 provided with a rectangular exposure opening 31. At one end of the flat section 29, the frame member is bent forwardly in conformity with the profile of the front surface of the film pack and terminates in a cross bar 32 supported by a central tongue 33. As best shown in FIGS. 3 and 4, the flat portion of the frame member is mounted to the camera housing by a plurality of screws 34 threaded into rearwardly projecting support webs 35 molded integrally with the housing. The forwardly located portion of the frame member adjacent to cross bar 32 is similarly attached to the camera housing by screws 36, but the cross bar itself is spaced from the internal surface of the front housing wall 25 as best illustrated in FIG. 5.

The end of the frame member opposite cross bar 32 is bent to provide an end wall member 37 and a partial back wall member 38. These wall members are adapted to provide a chamber which receives the thin end of the film pack when the latter is installed in an angular position in the camera housing and is then pressed forward into contact with the rearwardly facing surface of the frame member. When the film pack is in its loaded position, it is held in resilient contact with a pair of positioning fingers 39 by a leaf spring 41 compressed between end wall 37 of the frame member and the confronting end wall at the thin end of the film pack. Similarly, two pairs of locating fingers 42 on the frame member straddle the film pack to position it vertically so that its exposure window 17 is properly aligned with exposure opening 31 in the frame member. Two leaf springs 43 carried by the cover door engage the back wall surface of the film pack and urge the latter forwardly against the frame member. Accordingly, the frame member serves to locate the film pack accurately in predetermined relation to the operative position of the camera lens so that each successive film unit will be positioned in coincidence with a focal plane of the lens. Also, it will be apparent that the stiffness and strength of the frame plate imparts considerable structural rigidity to the molded plastic camera housing.

The bellows 27 is provided with an internal lip 44, shown in FIG. 4, which is sandwiched between the flat section of the frame member surrounding opening 31 and a rectangular sheet metal clamping plate 45 secured to the frame member by a plurality of screws 46 threaded into mating screw holes 47 shown at FIG. 3. This arrangement therefore insures perfect alignment between the screw holes in the frame member and the clamping plate and also eliminates threading the screws directly into the plastic housing material.

A rigid pressure pad member 48 is supported to the frame member cross bar 32 by screws 49. As best shown in FIG. 6, the pressure pad member includes a flat rearward face 51 rounded at its leading and trailing edges 52 and 52. Instead of comprising a separate piece, as shown, the pressure pad member obviously could be made as an integral part of the cross bar. When the film pack is installed in the camera, the leader strip 23 extending through film pack slot 18 is located behind the pressure pad member and extends through a slot 54 at the corresponding end of the camera housing. A pressure roller 55 is rotatably supported inside the cover door by its end pins 56 and is pressed against the leader strip opposite the pressure pad member when the cover door is closed and latched. The narrow tongue member 33 by which the cross bar is supported is flexed somewhat by the force exerted on the pressure pad member by the roller, thereby resiliently maintaining firm nip pressure on the portion of the film unit drawn between the pressure pad member and the roller.

As a film unit is withdrawn from the camera, the processing fluid container is ruptured by passing between the two pressure members and the processing fluid 57 is distributed uniformly between two confronting sheets 58 and 59 of the film unit as shown in FIG. 6. Because the pressure roller cooperates with the flat rearward pressure generating face 51 of the pressure pad member to provide the nip through which the film units are drawn, considerable misalignment can be tolerated between the roller and the pad member in the direction shown in exaggerated fashion in FIG. 7 without detracting substantially from the uniform distribution of the processing fluid. Even though one of the pressure members is skewed slightly relative to the other member, the gap and pressure between the members still will be substantially constant over their entire length. Similarly, if the roller member is not exactly parallel with respect to the initial position of the rearward face of the pressure pad, the resiliency of tongue 33 allows it to float or twist against the other pressure member as shown in broken lines in FIG. 8, thereby compensating for such misalignment. Accordingly, it will be apparent that considerable inaccuracy can be accepted in the means by which the two pressure members are supported relative to the camera housing, without prejudicing the proper functioning of the pressure members.

The invention has been described in detail with particular reference to the preferred embodiment thereof, but it will be understood that variations and modifications can be effected within the spirit and scope of the invention. By way of example only, the mounting of the pressure-applying members could be modified somewhat as described and illustrated in our commonly assigned, copending U.S. Pat. application, Ser. No. 130,752, entitled LATCH AND PRESSURE-APPLYING DEVICE and filed on even date herewith.

We claim:
1. In a self-processing film pack camera including:
 a housing having an interior compartment adapted to accommodate in an operative position a film pack having an edge portion and provided with a plurality of self-processing film units,
 a cover door mounted on said housing, said cover door being openable to provide access to said compartment and closable to cover said compartment,
 a lens,
 lens support means adapted to support said lens at an operative position forwardly of said compartment in said housing, and
 a first pressure member carried by said cover door and a second pressure member supported by said housing, said pressure members being located in confronting adjacent relation to each other when said cover door is closed to provide a pressure applying nip through which successive ones of the film units are movable to effect processing thereof,
 the improvement comprising:
 a frame member having an end portion and secured to said housing within said compartment essentially forwardly of and generally parallel with the operative position occupied by the film pack, said frame member including:
  a centrally located flexible tongue integral with said end portion,
  a cross bar integral with said flexible tongue, and
  means for supporting said second pressure member on said cross bar,
 whereby said flexible tongue maintains resilient pressure between said pressure members when said cover door is closed.

2. The invention defined by claim 1 in which said frame member further includes means defining a generally rectangular exposure opening in rearward alignment with the operative position of said lens.

3. The invention defined by claim 2 in which said first pressure member is a roller rotatably supported by said cover door, and in which said second pressure member defines a substantially flat rearwardly facing surface confronting said roller when said cover door is closed.

4. The invention defined by claim 3 in which said housing and said cover door are made of molded plastic material, and in which said frame member is secured to said housing by a plurality of fastening members adjacent to said exposure opening.

5. The invention defined by claim 3 further comprising rearwardly extending positioning means carried by said frame member and engageable with the edge portion of the film pack to position the film pack edgewise within said compartment.

6. The invention defined by claim 5 further comprising a lateral locating surface extending rearwardly from said frame member, and in which said positioning means includes a spring member attached to said frame member for engagement with the edge portion of the film pack to urge the film pack laterally so that it is pressed against said lateral locating surface in fixed relation to said housing.

7. The invention defined by claim 3 in which said camera further includes a collapsible bellows provided with a rearward lip, and wherein said lip is attached to said frame member adjacent to said exposure opening therein.

* * * * *